Aug. 4, 1931.  O. STEINER  1,817,781

SOUND REPRODUCING APPARATUS

Original Filed July 5, 1927

Inventor
Oscar Steiner,
by
His Attorney.

Patented Aug. 4, 1931

1,817,781

UNITED STATES PATENT OFFICE

OSCAR STEINER, OF PHILADELPHIA, PENNSYLVANIA, ASSIGNOR TO GENERAL ELECTRIC COMPANY, A CORPORATION OF NEW YORK

SOUND REPRODUCING APPARATUS

Application filed July 5, 1927, Serial No. 203,353. Renewed October 16, 1929.

My invention relates to the reproduction of sound from a photographic record on a moving film and particularly to the manner of supporting and guiding the moving film.

Prior to my invention the moving film bearing the sound record usually was drawn through a straight guide where a narrow light beam was directed through the sound record over the film into a photo-electric cell. A common means of limiting the light beam to the desired narrow width was by interposing in its path an opaque screen having an extremely thin transparent line or aperture therein. For the best results the film should run very close to the screen, yet to avoid scratching of the record it should not actually touch the screen or other stationary parts. A film strip having an emulsion on one side thereof when unrestrained naturally curls to a certain extent transversely with the emulsion side inward and this curling of the film has increased the difficulty of moving the film through the apparatus close to the apertured screen without danger of its being scratched. It is an object of my invention to provide improved means for supporting and guiding the film whereby as it passes through the light beam it maintains laterally a relatively fixed position.

In accordance with my invention I provide a drum having a circumferential opening therein for supporting and guiding the film and mount the photo-electric cell in a position to receive a light beam passing through the film record and the circumferential opening in the drum.

My invention will be better understood from the following description taken in connection with the accompanying drawings, and its scope will be pointed out in the appended claims.

Figure 1:
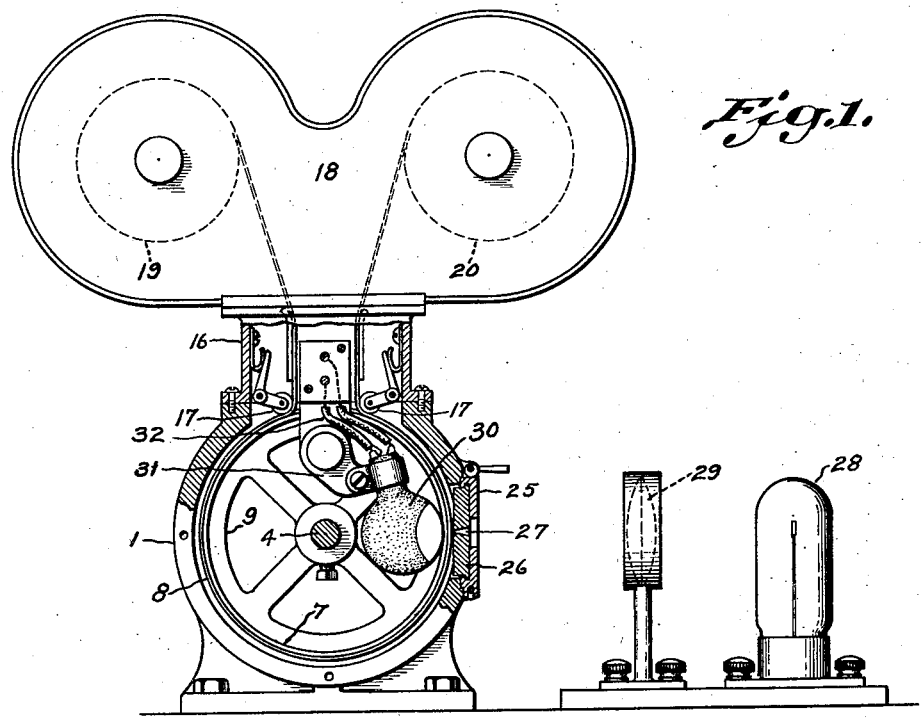
Figure 2:
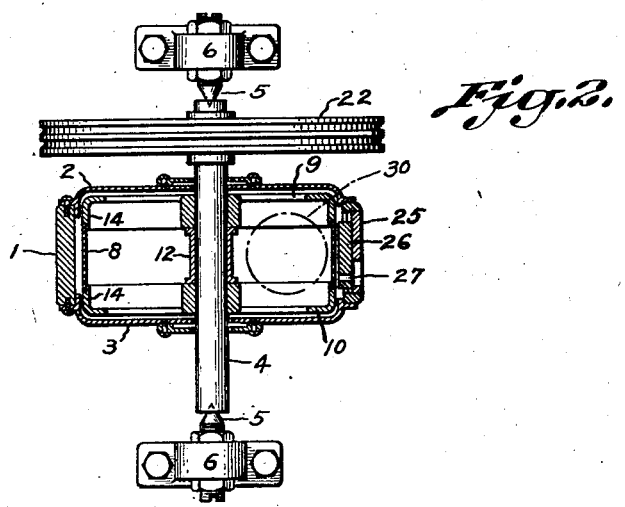

Referring to the drawings, Fig. 1 is a side elevation partly in section of apparatus embodying my invention and Fig. 2 is a top plan view of the same also partly in section.

The hollow base 1 having detachable end plates 2 and 3 has mounted concentrically therein the drum supporting shaft 4 the same being shown journalled on the points 5 mounted in the pillars 6. The drum 7 by which the film 8 is supported and guided comprises two similar spaced, complementary members 9 and 10 each fixed on the shaft 4 together with the spacer 12. At least one of these members, for example member 10, is adapted to be loosened and slid along the shaft after first removing the adjacent end plate 3 for gaining access to the interior of the drum. The two members 9 and 10 have peripheral flanges 14 which face each other and which are shown in the present embodiment as spaced apart a distance nearly equal to the width of the film. The flanges 14 are shown each having an annular recess which receives an edge of the film, care being taken in the construction to have the bottom of each recess run true when the shaft is rotated.

On the top of the base 1 is fastened the member 16 having suitable openings for the passage of the film and having the spring pressed rollers 17 which in pressing the film against the drum assist in preventing slippage of the film thereon. Above the member 16 is the magazine 18 containing the film reels 19 and 20. For rotating the drum the shaft is provided with a suitable belt or gear drive, the former being shown for convenience comprising the pulley 22 over which may pass a belt to a motor or other source of power. One or both of the reels 19 and 20 preferably are driven also as for example by a connection with the pulley 22 which connection has been omitted from the drawing to avoid unnecessary complication. The base 1 at one side thereof is shown provided with a detachable holder 25 into which slides the aperture containing plate 26 having a very narrow light aperture 27 positioned opposite the sound record on the film. The plate 26 does not touch the moving film but is arranged very close to it. In front of the aperture is mounted a suitable source of light 28 and a condensing lens 29 is arranged to direct an intense light beam on the aperture. Within the drum and opposite the aperture is the photo-electric cell 30 mounted in a fixed position by the bracket 31 which is secured to the member 16 and extends through the circumferential opening of the drum formed by the spacing of the drum members 9 and 10. The leads 32 of the cell also extend through the same opening to binding posts or other external connections.

With the apparatus as so arranged a light beam from the source 28 is concentrated on the aperture in plate 26 and a portion thereof controlled by the sound record on the moving film passes on through the space between the members 9 and 10 into the photo-electric cell 30. The drum thereby provides a firm support and guide for the film maintaining all portions thereof in exact position relative to the plate 26 and the aperture therein, yet it offers no obstruction to the light passing through the record on the film.

Although I have shown in the apparatus illustrated a plate having a narrow aperture for defining the narrow light beam which passes through the film, my invention is not limited to such apparatus but also is adapted for use where other means, for example an optical focusing means, are employed for defining the narrow light beam and which also require that that portion of the film passing the light beam shall remain in a relatively fixed position laterally.

I have chosen the particulr embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. In apparatus for reproducing sound from a film record, a rotatable drum for supporting a record film having a circumferential opening therein adapted to be bridged by the film, said drum having means for securing together in fixed relation the parts thereof on opposite sides of said opening, and a photo-electric cell arranged to receive light passing through said opening and the film bridging the same.

2. In apparatus for reproducing sound from a film record, a rotatable drum comprising portions separated axially by an opening and adapted to support a film at opposite sides of a sound record thereon, a connecting member common to both of said portions, a photo-electric cell and means for supporting the cell in a position to receive light passing through the record and through the opening between the drum portions.

3. In apparatus for reproducing sound from a film record. a rotatable drum for supporting a record film having a circumferential opening therein adapted to be bridged by the film and a photo-electric cell arranged within the drum, opposite said opening, the parts of the drum at opposite sides of said opening being fixedly connected with each other.

4. In apparatus for reproducing sound from a film record, a shaft, a film supporting drum mounted thereon comprising axially spaced complementary members, means for rotating the drum, a photo-electric cell, and means for supporting the cell in a fixed position within the drum and opposite the space between the members.

5. In apparatus for reproducing sound from a film record, a rotatable shaft, a film supporting drum mounted thereon comprising two axially spaced complementary portions one of said portions being movable along the shaft, a photo-electric cell within the drum and a support therefor extending through the space separating the two portions of the drum.

6. In apparatus for reproducing sound from a moving film having a sound record thereon, means comprising a drum for supporting the film, a photo-electric cell, and means for directing a light beam through the sound record into the photo-electric cell, the supporting means having an opening adapted to be bridged by the film and being constructed to support the film in a curved path at the point of intersection of the light beam therewith and at both sides of the sound record when passing said point, the portion of said supporting means at opposite sides of said opening being in fixed relation with each other.

7. In apparatus for reproducing sound from a moving film having a sound record thereon, an arcuate film supporting member curved in the direction of movement of the film and having portions in fixed relation with each other for engagement with the film on opposite sides of the sound record, a photo-electric cell, and means for directing a light beam through the sound record into said cell, said film supporting member having an opening therein to permit the free passage of the light beam therethrough.

8. In apparatus for reproducing sound from a moving film having a sound record thereon, a photo-electric cell, a source of light, means for directing a beam from said source through said record into said cell, and a member constructed and arranged to support the film in a longitudinally curved path at the point of intersection of the light beam therewith, said member having arcuate portions separated laterally by an open space for engaging the film at both sides of the sound record, and having means rigidly securing said portions together, the light beam being adapted to pass through the open space between said portions.

In witness whereof, I have hereunto set my hand this 1st day of July, 1927.

OSCAR STEINER.